United States Patent
Mitchell et al.

(10) Patent No.: US 7,624,732 B2
(45) Date of Patent: Dec. 1, 2009

(54) METHOD AND APPARATUS FOR EXTENDING FLIGHT CREW'S TIME OF USEFUL CONSCIOUSNESS AFTER DECOMPRESSION

(75) Inventors: Bradley J. Mitchell, Snohomish, WA (US); Trevor M. Laib, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 507 days.

(21) Appl. No.: 11/244,535

(22) Filed: Oct. 6, 2005

(65) Prior Publication Data

US 2007/0089746 A1   Apr. 26, 2007

(51) Int. Cl.
*B64C 1/00* (2006.01)
*B64C 1/14* (2006.01)
*A61M 16/00* (2006.01)
*A62B 11/00* (2006.01)

(52) U.S. Cl. .......................... 128/202.24; 128/205.24; 128/205.26; 244/99.1; 244/121; 454/71; 454/76

(58) Field of Classification Search ............ 128/205.15, 128/204.22, 205.26, 202.12, 202.24, 202.27, 128/204.18, 204.21, 204.29; 244/4 R, 6, 244/13, 171.9, 99.1, 99.2, 118.5, 119, 121, 244/129.4, 34 R; 165/235; 340/945; 454/71, 454/76

See application file for complete search history.

(56) References Cited

U.S. PATENT DOCUMENTS

| | | | |
|---|---|---|---|
| 3,027,090 A * | 3/1962 | Zerhan, Jr. ................. 236/49.5 |
| 3,584,567 A * | 6/1971 | Roach ........................... 454/73 |
| 3,675,878 A * | 7/1972 | Von Beckh ............... 244/171.7 |
| 4,432,514 A * | 2/1984 | Brandon ................... 244/118.5 |
| 4,576,088 A * | 3/1986 | Mathewes et al. ........... 454/194 |
| 4,646,993 A | 3/1987 | Baetke |
| 4,899,960 A * | 2/1990 | Hararat-Tehrani et al. ........................ 244/118.5 |
| 5,048,239 A * | 9/1991 | Filitz et al. ........................ 52/1 |
| 5,085,017 A * | 2/1992 | Hararat-Tehrani ................. 52/1 |
| 5,118,053 A * | 6/1992 | Singh et al. .............. 244/118.5 |
| 5,590,852 A * | 1/1997 | Olson ....................... 244/118.5 |
| 5,606,829 A * | 3/1997 | Hararat-Tehrani ................. 52/1 |
| 5,871,178 A * | 2/1999 | Barnett et al. ............. 244/118.5 |
| 6,264,141 B1 * | 7/2001 | Shim et al. ................ 244/118.5 |
| 6,338,677 B1 * | 1/2002 | White .......................... 454/335 |
| 6,507,776 B1 * | 1/2003 | Fox, III ........................ 701/11 |
| 6,651,932 B2 * | 11/2003 | Diehl et al. ............... 244/129.1 |
| 6,880,785 B2 * | 4/2005 | Barbara et al. ........... 244/118.5 |
| 7,093,666 B2 * | 8/2006 | Trumper ....................... 169/62 |
| 7,232,097 B2 * | 6/2007 | Noiseux et al. .............. 244/121 |
| 2003/0052227 A1 * | 3/2003 | Pittman .................... 244/118.5 |
| 2003/0132345 A1 * | 7/2003 | Lehmann ................. 244/118.5 |
| 2003/0222175 A1 * | 12/2003 | Movsesian et al. ........ 244/118.5 |
| 2004/0094670 A1 * | 5/2004 | Pratt et al. ................ 244/129.4 |
| 2005/0082433 A1 * | 4/2005 | Saku et al. ............... 244/129.5 |

* cited by examiner

*Primary Examiner*—Justine R Yu
*Assistant Examiner*—Clinton Ostrup
(74) *Attorney, Agent, or Firm*—Rozenblat IP LLC

(57) ABSTRACT

Systems and methods are provided for regulating the pressure within an aircraft flight crew area during and/or after a decompression event. For example, an aircraft may include a flight crew area, at least one pressure sensor for detecting the pressure of the atmosphere within the flight crew area, and at least one regulated decompression panel that is operatively associated with the pressure sensor, for regulating the pressure within the flight crew area during and/or after a decompression event.

24 Claims, 4 Drawing Sheets

METHOD AND APPARATUS FOR EXTENDING FLIGHT CREW'S TIME OF USEFUL CONSCIOUSNESS AFTER DECOMPRESSION

FIELD OF THE INVENTION

The invention is generally directed to aircraft, and more particularly, to crew area environmental systems for aircraft.

BACKGROUND DESCRIPTION

Modern aircraft operate at altitudes at which there is insufficient oxygen to sustain normal human conscious activities. A recent National Transportation Safety Board Aircraft Accident Brief (NTSB/AAB-00/01 at 6, fn 11) provides background information on this topic:

Pressurized aircraft cabins allow physiologically safe environments to be maintained for flight crew and passengers during flight at physiologically deficient altitudes. (At altitudes above 10,000 feet, the reduction in the partial pressure of oxygen impedes its ability to transfer across lung tissues into the bloodstream to support the effective functioning of major organs, including the brain. These altitudes are typically referred to as "physiologically deficient altitudes.") At cruising altitudes, pressurized cabins of turbine-powered aircraft typically maintain a consistent environment equivalent to that of approximately 8,000 feet by directing engine bleed air into the cabin while simultaneously regulating the flow of air out of the cabin. The environmental equivalent altitude is referred to as "cabin altitude."

Current rules of operation for Transport Category airplanes, Federal Aviation Regulation (hereafter referred to as "FAR") 121.333, require a pilot to don and use an oxygen mask whenever the airplane is above 25,000 feet and the pilot is alone on the flight deck and require at least one pilot to don and use oxygen at all times when the airplane is above 41,000 feet.

Similarly, for pressurized commuter and on demand aircraft operations, FAR 135.89 require a pilot to don and use an oxygen mask whenever the airplane is above 25,000 feet and the pilot is alone on the flight deck, and require at least one pilot to don and use oxygen at all times when the airplane is above 35,000 feet.

These requirements exist because external air pressure at cruise altitude is below the oxygen pressure in the pilot's bloodstream. In the event the cabin lost pressurization, the pilot would rapidly lose consciousness due to hypoxia. The "time of useful consciousness" following a loss of pressurization is shown in Table 1 below.

TABLE 1

| Altitude (ft) | Time of useful consciousness without supplemental oxygen | Ambient pressure of air (psi) | Partial pressure of 21% oxygen (psi) | Partial pressure of 50% oxygen (psi) |
| --- | --- | --- | --- | --- |
| 40,000 | 15 seconds | 2.72 | 0.57 | 1.36 |
| 35,000 | 20 seconds | 3.45 | 0.73 | 1.73 |
| 30,000 | 30 seconds | 4.36 | 0.92 | 2.18 |
| 28,000 | 1 minute | 4.77 | 1.00 | 2.39 |
| 26,000 | 2 minutes | 5.22 | 1.10 | 2.61 |
| 24,000 | 3 minutes | 5.69 | 1.20 | 2.85 |
| 22,000 | 6 minutes | 6.20 | 1.30 | 3.10 |
| 20,000 | 10 minutes | 6.75 | 1.42 | 3.37 |
| 15,000 | Indefinite | 8.29 | 1.74 | 4.15 |

Source of Table 1: "Physiologically Tolerable Decompression Profiles for Supersonic Transport Type Certification," Office of Aviation Medicine Report AM' 70-12, S. R. Mohler, M.D., Washington, D.C.; Federal Aviation Administration, July 1970.

An oxygen mask provides a means of supplying 50% or 100% oxygen to the pilot at ambient or near-ambient pressure. Oxygen naturally comprises 21% of the air which, at 15,000 ft., exerts a partial pressure of approximately 1.74 psi. As shown in Table (1) above, the same partial pressure may be provided at 35,000 ft with 50% oxygen, or above 40,000 ft with 100% oxygen (see "Ambient pressure" column above). This is how an oxygen mask provides an extended time of useful consciousness in an unpressurized aircraft at cruise altitudes.

During a decompression event at high altitudes, it is conceivable a single pilot, trying to handle an emergency unassisted, could lose consciousness before he or she would be able to don an oxygen mask. Thus the requirement to wear an oxygen mask for any pilot alone on the flight deck.

Even with the development of quick-donning oxygen masks, the brief time between a rapid loss of aircraft cabin pressure and the donning and activation of an oxygen mask may be too long to ensure adequate oxygen for the pilot to safely control the aircraft and avoid losing consciousness. As noted by the NTSB: "Research has shown that a period of as little as 8 seconds without supplemental oxygen following rapid depressurization to about 30,000 feet may cause a drop, in oxygen saturation that can significantly impair cognitive functioning and increase the amount of time required to complete complex tasks." NTSB/AAB-00/01 at 34. However, during a rapid decompression event, it is important to prevent an excessive pressure differential between the crew area (e.g., the cockpit) and the rest of the aircraft, to prevent structural damage to the aircraft. For this reason, a pressure equalization panel may be mounted between the crew area and an aircraft main cabin.

Accordingly, there is a need for improved systems for ensuring an oxygen supply to aircraft crew members in the event of a sudden loss of cabin pressure in an aircraft. The present invention is directed to overcoming one or more of the problems or disadvantages associated with the prior art.

This invention provides apparatuses and methods for maintaining pressure in an aircraft flight crew area, and/or re-pressurizing the flight crew area during and/or after a depressurization event, in order to extend the time of useful consciousness after a decompression, e.g., due to a breach of an aircraft door or fuselage structure.

In accordance with one aspect of the invention, an aircraft includes a flight crew area, at least one pressure sensor for detecting the pressure of the atmosphere within the flight crew area, and at least one regulated decompression panel that is operatively associated with the pressure sensor, for regulating the pressure within the flight crew area after a decompression event.

In accordance with another aspect of the invention, a method of extending the time of useful consciousness of a crew of a pressurized aircraft during and/or after a decompression event is provided. The method includes: providing a crew area; providing a pressure sensor adapted to detect the pressure of the atmosphere within the crew area; sensing pressure of the atmosphere within the crew area using the pressure sensor; and regulating the decompression of the atmosphere within the crew area when the pressure of the atmosphere within the crew area has fallen below a predetermined level.

In accordance with yet another aspect of the invention, a system is provided for extending the time of useful consciousness of a crew of a pressurized aircraft during and/or after a decompression event. The system may include a crew area, a pressure sensor adapted to detect the pressure of the atmosphere within the crew area, and an electronic controller linked to the pressure sensor. The electronic controller may be programmed to regulate the decompression of the atmosphere within the crew area when the pressure of the atmosphere within the crew area has fallen below a predetermined level.

In accordance with another aspect of the invention, a source of air and/or oxygen may be provided for re-pressurizing the crew area after a decompression event.

The features, functions, and advantages may be achieved independently in various embodiments of the present invention or may be combined in yet other embodiments.

Following a decompression event in a pressurized aircraft, the time of useful consciousness of the aircraft crew may be extended by preventing the pressure around the crew from dropping all the way to ambient levels, or by combining increased pressure with increased oxygen.

This invention provides several systems and methods to extend the time of useful consciousness of a pilot or other crewmember in an occupied compartment, such as, for example, a flight deck.

Figure 1:
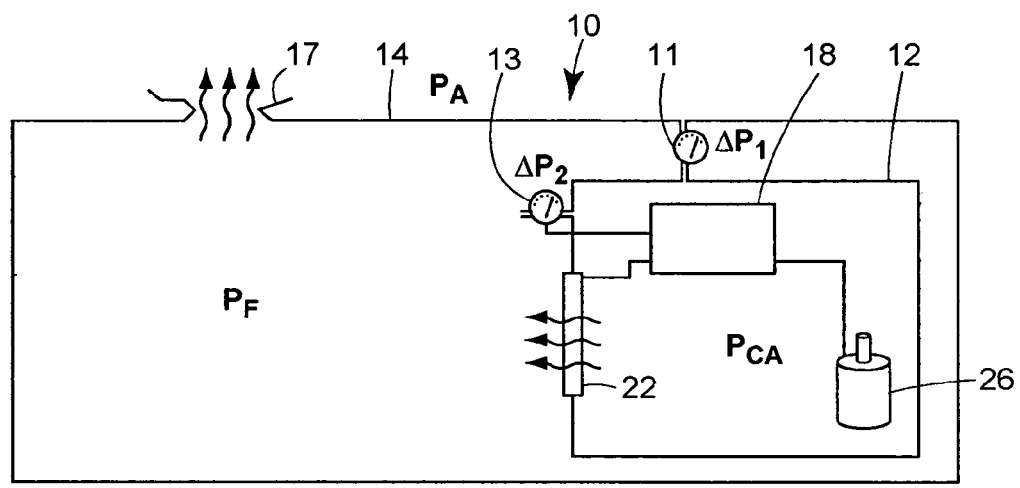
FIG. 1 is a diagrammatic plan view of a system for regulating pressure in a crew area of an aircraft after a decompression event.

FIG. 1 illustrates one possible layout of a pressure regulation system 10 according to one aspect of the invention. One or more crewmembers may be contained within a crew area 12 (such as in a flight deck or a crew rest compartment), separated from the rest of a pressurized aircraft fuselage 14.

The walls of the crew area 12 may be designed to withstand some maximum pressure differential, $P_{STR}$, which is approximately 2 psi for many existing airplanes. Of course, $P_{STR}$ may be higher or lower than 2 psi, depending on the specific design and construction of the crew area 12. In the event of some structural penetration 17 in the fuselage 14, the fuselage area will rapidly decompress. A mechanical decompression panel assembly 22 may be used to keep the pressure in the crew area 12 below $P_{STR}$, thereby maintaining the integrity of the walls of the crew area 12.

A first pressure differential, $\Delta P_1$, between pressure in the crew area 12, $P_{CA}$, and the ambient pressure outside the aircraft, $P_A$, may be measured by a first pressure sensor 11. A second pressure differential, $\Delta P_2$, between the crew area pressure, $P_{CA}$, and the pressure, $P_F$, in adjacent areas of the aircraft fuselage 14, may be measured by a second pressure sensor 13. Additionally, the position of a decompression panel 24 (FIG. 2) in the decompression panel assembly 22 may be monitored. These signals may be fed to an electronic controller 18.

Figure 2:
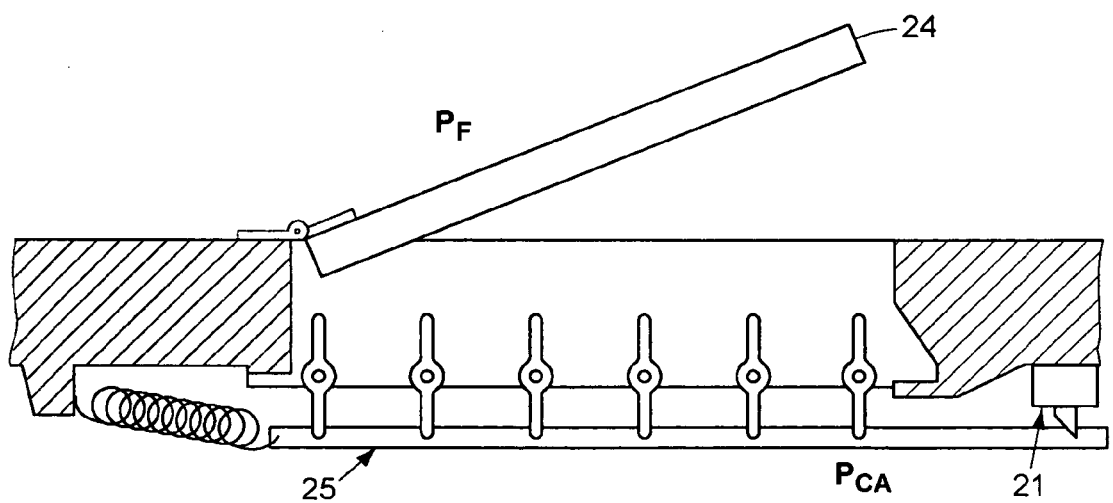
FIG. 2 is an enlarged view of a portion of the system of FIG. 1, illustrating a decompression panel design that may be used in the system of FIG. 1.

As shown in FIG. 2, the decompression panel assembly 22 may be further fitted with a shutter 25, and an actuator 21, connected to the electronic controller 18. The shutter 25 may be closed partway through a decompression event to maintain pressure within the crew area 12 by sealing off the crew area 12, thereby extending the time of useful consciousness of the occupants.

Figure 3:
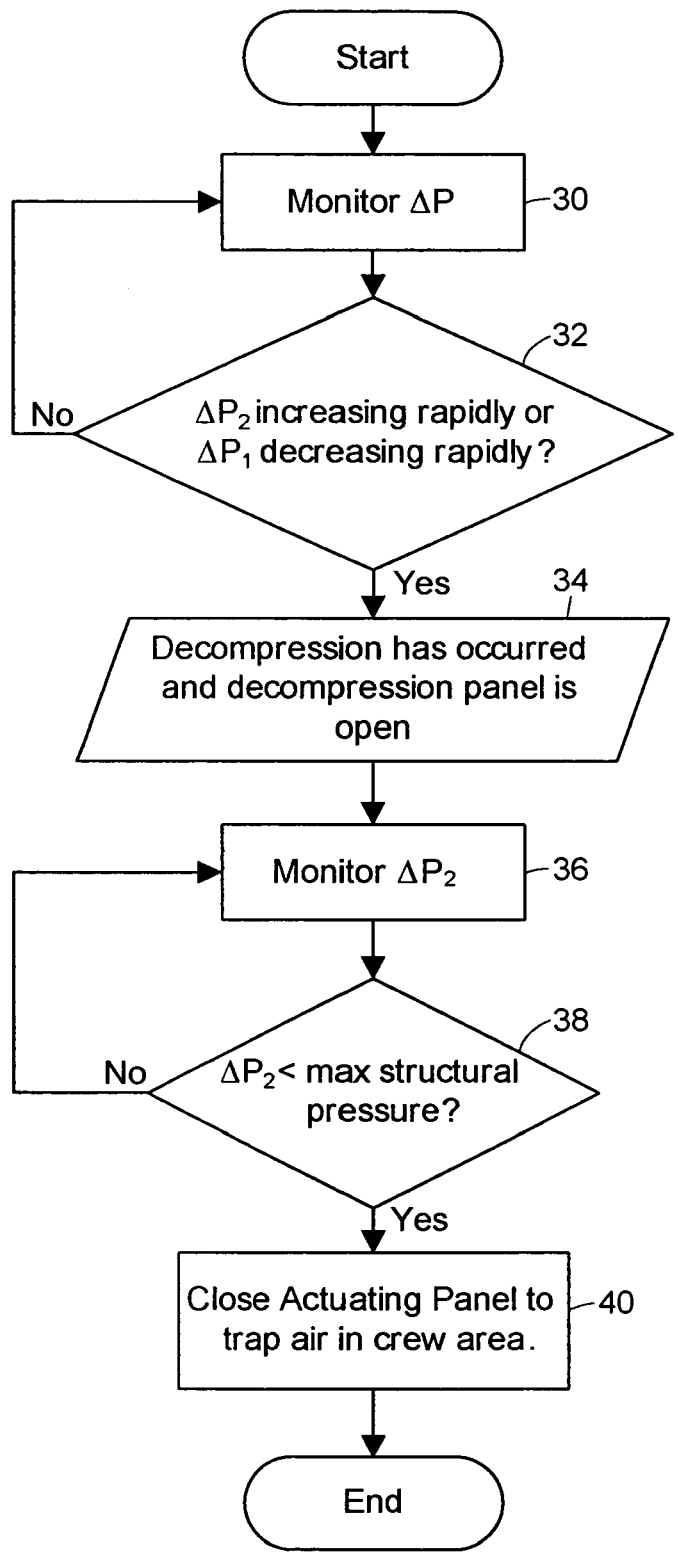
FIG. 3 is a logic diagram illustrating an example of a method of providing protection from a depressurization in a crew area of an aircraft.

With reference to the logic diagram in FIG. 3, the electronic controller 18 may detect a decompression event by a sufficiently rapid change in $\Delta P_1$, $P_{CA}$, $\Delta P_2$, and/or by detecting the decompression panel 24 opening, as indicated at 30 and 32. After detecting the decompression event at 34, the electronic controller 18 monitors $\Delta P_1$ at 36 and 38, until this pressure falls below $P_{STR}$. At this point, the controller may command triggering of the actuator 21, which causes shutter 25 to close as indicated at 40, preventing further airflow through the decompression panel assembly 22.

This action reduces the rate of depressurization of the crew area 12, thereby extending the time of useful consciousness for the occupants. Sealing other leakage paths further reduces the rate of depressurization.

In accordance with another aspect of this invention, a gas cylinder 26 may be connected to and activated by the controller 18 such that air leaking from the crew area 12 may be continuously replenished, maintaining the pressure within the crew area 12, further extending the time of useful consciousness. Significantly greater extensions of time of useful consciousness may be attained if the gas in cylinder 26 is oxygen-enriched air, or pure oxygen.

Figure 5:
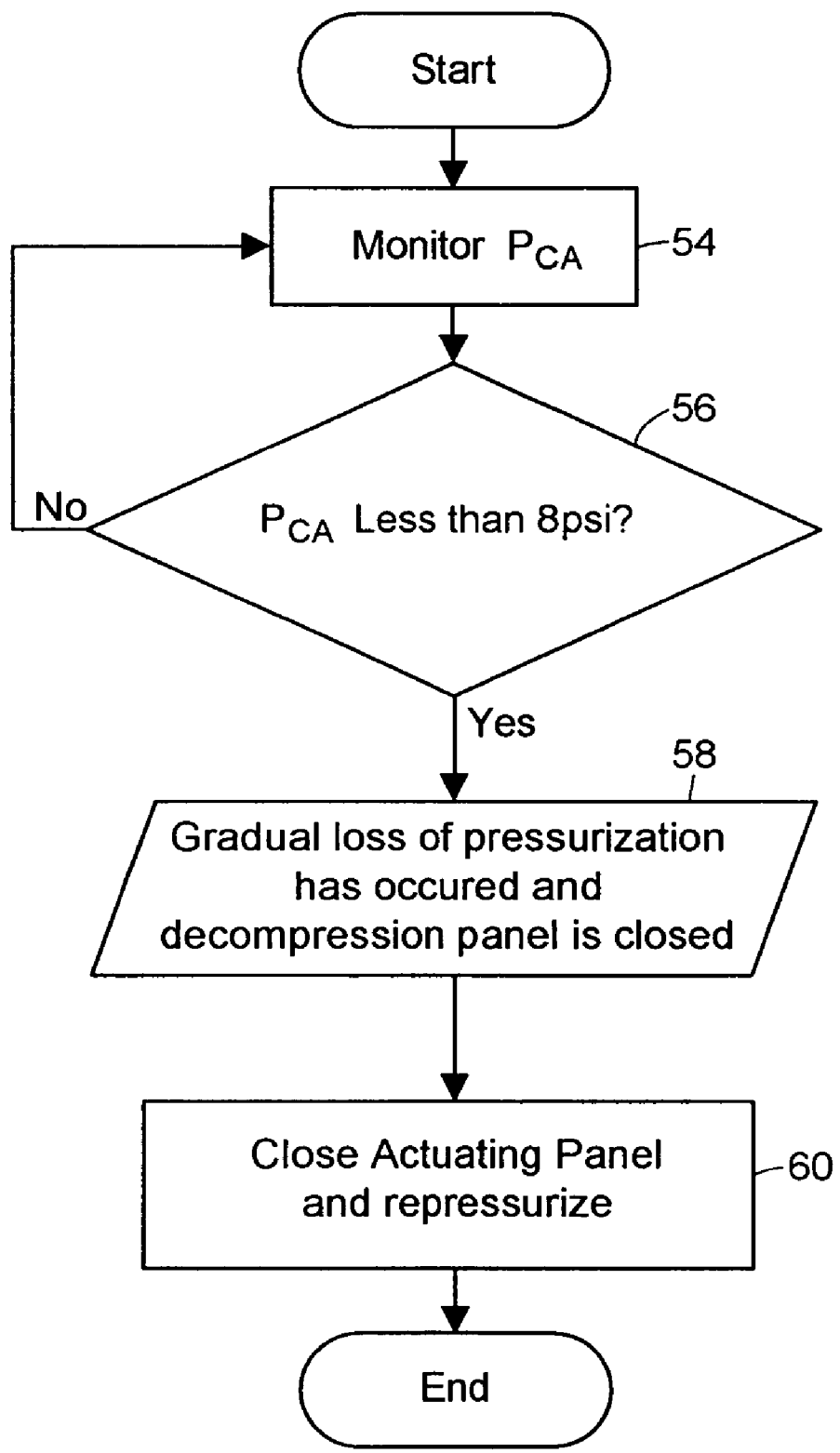
FIG. 5 is a logic diagram illustrating an example of a method of providing protection from a gradual loss of pressure in a crew area of an aircraft.

Protection from a gradual loss of pressurization event may be achieved by monitoring $\Delta P_1$, or $P_{CA}$, such that when either pressure falls below a preset level, the shutter 25 in assembly 22 closes. As above, a gas cylinder may be used to maintain the pressure within the crew area 12. For example, as shown in FIG. 5, the electronic controller 18 detects a gradual loss of pressurization by monitoring $P_{CA}$, as indicated at 54 and, as indicated at 56 checking whether $P_{CA}$ is less than a threshold absolute pressure, such as, for example 8 psia. If a gradual loss of pressurization has occurred the decompression panel 24 will remain closed, as indicated at 58, because $\Delta P_2 \approx 0$. Then, as indicated at 60, the controller may command the actuating panel to close and the crew area 12 to be repressurized.

Figure 4:
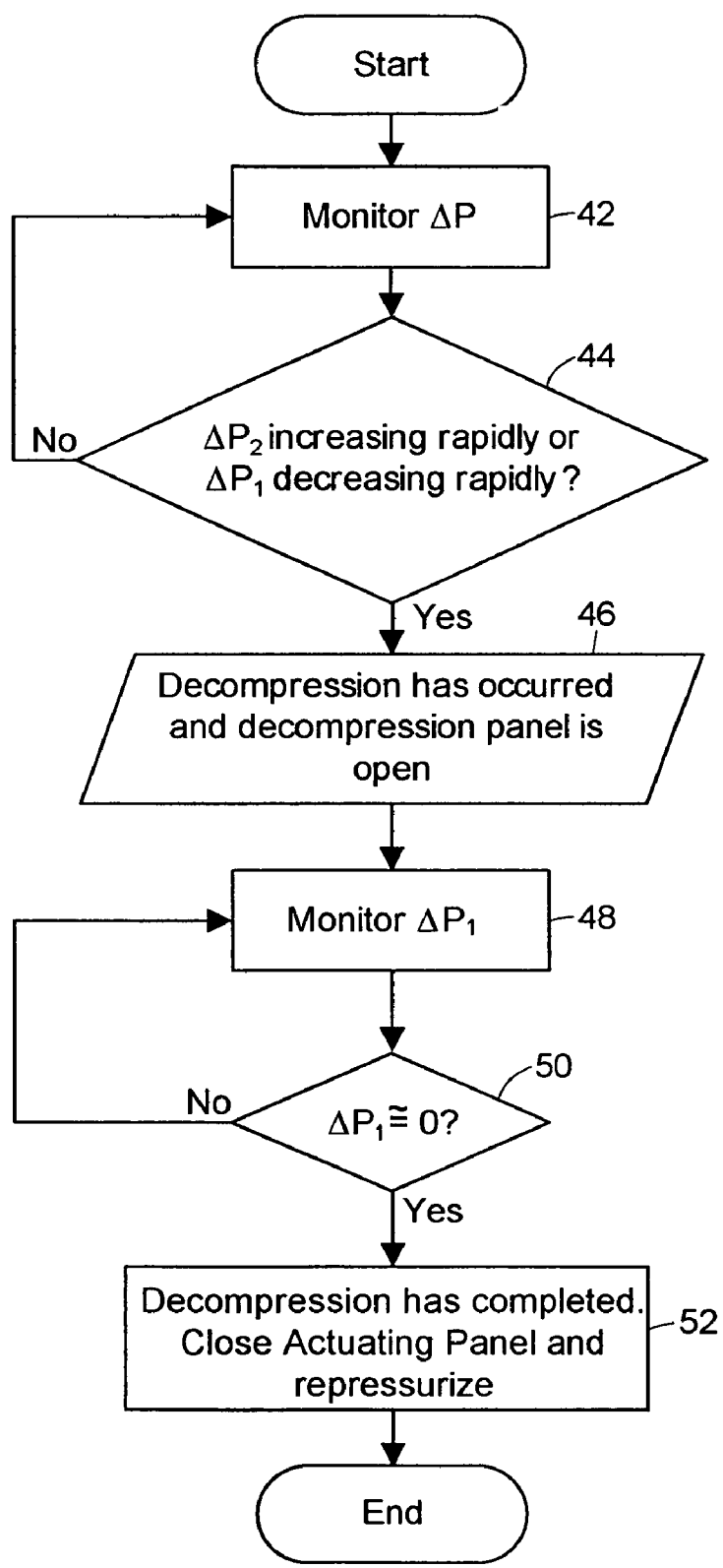
FIG. 4 is a logic diagram illustrating an example of a method of repressurizing a crew area of an aircraft.

In another embodiment of this invention, the crew area 12 may be allowed to entirely depressurize before the shutter 25 in assembly 22 is closed, after which the volume is repressurized with air, oxygen-enriched air, or oxygen from gas cylinder 26. For example, as indicated at FIG. 4, the electronic controller 18 detect a decompression event by a sufficiently, rapid change in $\Delta P_1$, $P_{CA}$, $\Delta P_2$, and/or by detecting the decompression panel 24 opening, as indicated at 42 and 44. After detecting the decompression event at 46, the electronic controller 18 monitors $\Delta P_1$ to see whether it is approximately 0, as indicated at 48 and 50. If $\Delta P_1$ is approximately 0, decompression is completed, and the electronic controller 18 will close the actuating panel and initiate repressurization of the crew area 12, as indicated at 52.

This method could make use of the decompression panel 22 illustrated in FIG. 2 or a similar panel that, can be rapidly opened and closed. Further, electronic controller 18 might be replaced by a pneumatically operated mechanical controller or other equivalent device.

Other aspects and features of the present invention can be obtained from a study of the drawings, the disclosure, and the appended claims.

What is claimed is:

1. An aircraft, comprising:
a pressurized fuselage;
at least one crew area separated from the pressurized fuselage;
at least one decompression panel assembly comprising a decompression panel and a shutter, the decompression panel adapted to open to allow air to escape from the crew area in the event of a rapid loss of pressurization in order to prevent failure of the crew area;
a sensor for detecting pressure conditions; and
a mechanism for moving the shutter of the at least one decompression panel assembly from an open position to a closed position to slow or stop further loss of air from the crew area when the sensor detects that pressure conditions are such that the crew area is capable of retaining a remaining pressure.

2. The aircraft of claim 1, wherein the mechanism comprises an electronic controller that is programmed to monitor the sensor, and to control the shutter in response to a predetermined pressure condition.

3. The aircraft of claim 1, wherein the mechanism comprises an actuator.

4. The aircraft of claim 1, further including a source of oxygen or air for re-pressurizing the crew area and/or enriching oxygen concentration in the crew area after a decompression event, while preventing the pressure from rising to a level that would exceed the strength of the crew area.

5. The aircraft of claim 4 wherein the source comprises a gas cylinder.

6. The aircraft of claim 5 wherein the gas cylinder is controlled by an electronic controller for continuously replenishing the air leaking from the crew area in order to maintain the pressure within the crew area.

7. A method of extending the time of useful consciousness of one or more occupants of a pressurized aircraft after a decompression event, comprising:
providing an aircraft having a pressurized fuselage, at least one crew area separated from the pressurized fuselage, at least one decompression panel assembly comprising a decompression panel, a shutter, a mechanism, and a sensor;
detecting pressure conditions within the pressurized aircraft using the sensor;
opening the decompression panel to allow air to escape from the crew area during an event of a rapid loss of pressurization in order to prevent failure of the crew area; and
moving the shutter from an open position to a closed position using the mechanism in order to slow or stop further loss of air from the crew area at a time when the sensor detects that pressure conditions are such that the crew area is capable of retaining a remaining pressure.

8. The method of claim 7, further including re-pressurizing the crew area to a level that can be safely contained.

9. The method of claim 7, further including enriching oxygen concentration in the crew area.

10. The method of claim 9 wherein the enriching step comprises enriching oxygen concentration in the crew area using a gas cylinder supplying oxygen.

11. The method of claim 10 wherein an electronic controller controls the gas cylinder.

12. The method of claim 7, further including sealing off the crew area at a predetermined atmospheric pressure within the crew area.

13. The method of claim 7, further including sealing off the crew area at a predetermined pressure differential between an atmospheric pressure within the crew area and an atmospheric pressure within an area inside the aircraft that is outside of the crew area.

14. The method of claim 13, wherein the atmospheric pressure differential is determined based on a comparison of atmospheric pressure within the crew area with an atmospheric pressure outside of the aircraft.

15. The method of claim 7 wherein the mechanism comprises an actuator.

16. The method of claim 7 wherein the mechanism comprises an electronic controller.

17. A system for extending a time of useful consciousness of one or more occupants of a pressurized aircraft after a decompression event, the system comprising:
a crew area of the aircraft separated from a pressurized fuselage of the aircraft;
a pressure sensor adapted to detect a pressure of an atmosphere within the crew area;
a shutter which is adapted to move from an open position to a closed position to allow air to escape from the crew area in the event of a rapid loss of pressurization in order to prevent failure of the crew area;
a mechanism for moving the shutter from the open position to the closed position to reduce further loss of air from the crew area when pressure conditions are such that the crew area is capable of retaining a remaining pressure; and an electronic controller linked to the pressure sensor;
wherein the electronic controller is programmed to regulate decompression of the atmosphere within the crew area when the pressure of the atmosphere within the crew area has fallen to a level which will be safely contained.

18. The system of claim 17, further including a source of oxygen for at least one of re-pressurizing and enriching an oxygen concentration in the crew area.

19. The system of claim 18 wherein the source of oxygen comprises a gas cylinder.

20. The system of claim 19 wherein the gas cylinder is controlled by the electronic controller for continuously replenishing the air leaking from the crew area in order to maintain the pressure within the crew area.

21. The system of claim 17, wherein the shutter is operatively connected to the electronic controller for sealing off the crew area.

22. The system of claim 21, wherein the electronic controller is programmed to actuate the shutter to seal off the crew area at a predetermined pressure differential between the atmospheric pressure within the crew area and an atmospheric pressure within an area inside the aircraft that is outside of the crew area.

23. The system of claim 22, wherein the atmospheric pressure differential is determined based on a comparison of the atmospheric pressure within the crew area with an atmospheric pressure outside of the aircraft.

24. The system of claim 17 wherein the mechanism comprises an actuator.

* * * * *

UNITED STATES PATENT AND TRADEMARK OFFICE
CERTIFICATE OF CORRECTION

| | |
|---|---|
| PATENT NO. | : 7,624,732 B2 |
| APPLICATION NO. | : 11/244535 |
| DATED | : December 1, 2009 |
| INVENTOR(S) | : Mitchell et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 690 days.

Signed and Sealed this

Twenty-sixth Day of October, 2010

David J. Kappos
*Director of the United States Patent and Trademark Office*